United States Patent [19]
Lemoine

[11] Patent Number: 5,088,077
[45] Date of Patent: Feb. 11, 1992

[54] SYNCHRONIZATION OF RECORD MEDIA TRANSPORTS AND TRACKING ADJUSTMENT

[75] Inventor: Maurice G. Lemoine, Redwood City, Calif.

[73] Assignee: Ampex Corporation, Redwood City, Calif.

[21] Appl. No.: 270,924

[22] Filed: Nov. 10, 1988

[51] Int. Cl.⁵ .................. G11B 21/10; G11B 27/10; G11B 27/02

[52] U.S. Cl. ............................. 369/43; 369/50; 369/83; 360/77.14; 360/14.2; 360/40; 360/73.2; 360/73.02

[58] Field of Search ................ 360/13–14.3, 360/18, 19.1, 39, 40, 22, 23, 73.03, 27, 32, 331, 51, 72.2, 73.02, 73.09–73.14, 77.13–77.16, 77.01–77.11, 76; 358/310, 311; 369/84, 85, 50, 59, 43, 83

[56] References Cited

U.S. PATENT DOCUMENTS

| | | | |
|---|---|---|---|
| 4,348,669 | 9/1982 | Isuchiya et al. | 360/73.12 |
| 4,356,518 | 10/1982 | Lemoine et al. | 360/51 |
| 4,445,153 | 4/1984 | Fujimoto et al. | 360/77.06 |
| 4,485,337 | 11/1984 | Sandusky | 360/73.03 |
| 4,603,412 | 7/1986 | Yamazaki | 360/73.03 |
| 4,651,232 | 3/1987 | Lemoine et al. | 360/73.12 |
| 4,758,908 | 7/1988 | James | 360/13 |

OTHER PUBLICATIONS

"Ampex Digital Format For Video and Audio Tape Recording of Composite Video Signals Using 19 mm Type D-1 Cassette", Revision D, Jul. 1987.

Primary Examiner—Aristotelis M. Psitos
Assistant Examiner—Steven R. Garland
Attorney, Agent, or Firm—James Sprowl; Elizabeth Strnad

[57] ABSTRACT

In a digital tape recording system for video and sound signals, in which information in each track is stored in plural sectors having synchronizing preambles that aid in synchronizing the playback of the information, special preambles containing a frequency component that is lower than normal are used for the first sector of the first track in each video frame or field. The normal and special preambles are produced by passing the binary code". . . 01010101 . . . " (in the case of all but the first sector of each frame or field) or ". . . 011011011011 . . . " (in the case of the first sector) through a Miller Channel Code encoder to produce, in the first case, a synchronizing square wave fluctuating at one-fourth the bit presentation frequency, and in the second case, a synchronizing square wave fluctuating at one-sixth the bit presentation frequency. Special resonant circuits associated with the playback circuitry detect the special lower frequency component and signal the precise start of a new frame or field. This signal is used for capstan synchronization, head positioning during playback, and head positioning during editing when the record heads are used as playback heads so that they may be properly positioned to overwrite individual sectors on a track without overwriting other sectors.

43 Claims, 10 Drawing Sheets

SYNCHRONIZATION OF RECORD MEDIA TRANSPORTS AND TRACKING ADJUSTMENT

FIELD OF THE INVENTION

The invention relates to information recording and reproducing devices such as video tape recorders. In particular, it relates to synchronizing the operation of moving record media transports in such devices.

BACKGROUND OF THE INVENTION

Moving media information recording and reproducing devices, such as magnetic tape and magnetic and optical disc recorders and players, sometimes must synchronize their operations precisely with external signals or with other such devices. For example, in a television recording studio, the playback of video information must be synchronized precisely with a studio reference signal to facilitate transient-free switching between multiple sources of video. When audio or video information recorded upon moving magnetic media is edited, it is essential to synchronize precisely the operation of the source of the information with that of the machine upon which the information is to be recorded, again to assure transient-free transitions between information recorded previously and newly-recorded information added through editing.

Helical scan video tape recorders have a separate control signal track recorded at the edge of the tape that can be used for synchronization purposes. The more recent of these recorders record the information in digital form. The audio and video information is packaged into sectors which are recorded onto diagonal tracks that extend across the tape. The information flow rate is so great that pairs of closely spaced heads mounted upon a rotating scanner are used to record two tracks simultaneously. As each pair of tracks is recorded by these moving scanner-mounted heads, a separate, stationary recording head records pulses onto the control signal track that mark the locations of pairs of tracks.

When such a video tape is played back, a capstan servo system is used to adjust the speed and phase of the playback capstan drive by comparing the timing of the pulses reproduced from the control signal track with the timing of pulses that are synchronized with a studio reference signal or other stable reference. The servo mechanism adjusts the frequency and the phase of the capstan drive so that the speed of tape motion during playback is precisely that needed to synchronize the control signal track pulses with the stable reference pulses.

Under certain circumstances, this provides insufficient precision and further correction is needed. The spacing between the helically scanned diagonal tracks is so small that a capstan servomechanism controlled solely by control signal track information can sometimes position the tape so that the scanning pair of heads is positioned over and scanning the wrong pair of tracks. This mispositioning of the scanning heads can be detected after the digital information recovered from the sectors on the tape is fully decoded, error corrected, and analyzed, because each sector within each track contains information that identifies what information the sector contains and its position. Appropriately designed control circuitry can detect and correct this positioning error only after the digital information is fully recovered.

This technique for achieving proper playback synchronization can be utilized only if the tape playback system includes a complete set of playback signal processing elements for recovering the information, typically including circuitry for generating a playback timing signal and synchronizing it with the actual playback signal, circuitry for demodulating the encoding of the information flowing from the tape (which may have been encoded, for example, using the channel code as described in Miller U.S. Reissue Pat. No. Re. 31,311, which code is hereinafter referred to as the Miller Channel Code), circuitry for unshuffling the information if it has been shuffled, circuitry for combining the information flowing from the pairs of tracks that are scanned simultaneously, and circuitry for performing error detection and correction (as by using well known Reed-Solomon error correcting codes). Collectively, these playback signal processing elements are hereinafter called a "playback signal processing unit."

Situations arise where it is desirable to achieve playback capstan synchronization but it is not necessary to recover the information. In such situations it would be desirable to be able to achieve such synchronization without the need of such a playback signal processing which would otherwise be required. For example, when using multiple tape transports to duplicate tapes or to provide for rapid switching between multiple queued-up tapes, it would be less expensive to provide only one playback signal processing unit which can be shared by all of the multiple tape transports, connecting it to the playback signals produced by whichever output is to be transmitted or monitored, rather than to equip each transport with its own independent playback signal processing unit. However, in prior systems if only one playback signal processing unit were provided, then when switching a single playback signal processing unit from the output of a first machine to that of a second machine, there would be no way to synchronize the output of the second machine with that of the first. That is, because the second is not connected to the playback signal processing unit prior to the moment of switching, it cannot be fully synchronized with that of the first. There would be no assurance that a switching transient would not occur when the playback signal processing unit was switched from the output of the first machine to that of the second.

Other problems arise in editing or tape duplication situations, when new material is to be added to a tape containing existing material, and a smooth, transient-free transition between the new and existing material is desired, and particularly where entire sectors are to be transferred intact from one magnetic tape to another, possibly without disturbing other sectors on the target tape (as when the video sectors are replaced and the audio sectors are not replaced, or vice versa). Because the record and playback head pairs are mounted 90 degrees apart from each other on the rotating scanner, the playback heads are not adjacent the record heads and therefore may not be used to position the record heads for recording. Therefore, playback information extracted from the record heads (used as playback heads for this purpose) must be used to check that the record heads are properly positioned over the correct tracks. Unfortunately, the record head gaps are conventionally wider than the playback head gaps and cannot reproduce the highest recorded frequencies properly.

Thus even where a playback signal processing unit is available and connected to the record heads (used as playback heads for head positioning purposes), the playback signal may be so badly degraded by the poor frequency response of the record heads (when used for playback) that the playback signal cannot be properly decoded and used to check the head positioning.

It is also practical in some editing situations to transfer digital information encoded into sectors directly from one tape to another tape without fully decoding the information but keeping it intact as complete sector units. In such a case, it would not be necessary to provide a playback signal processing unit unless it were needed for synchronization. In practice, this is how only the video sectors or only the audio sectors can be transferred from one tape to another. To carry out such a transfer of complete sectors from the playback heads of one machine to the record heads of another, it is essential that the playback machine scan its tracks and sectors (with its playback heads) nearly synchronously with the record machine's scanning of its tracks and sectors (with its record heads). Absolute precision in synchronization is not essential because the positioning of any given sector within a track may be changed slightly without adverse consequences due to the edit gaps that separate the sectors sharing a common track from each other.

In these and other analogous situations, it would be desirable to facilitate the synchronizing of playback machines with a studio reference, the synchronizing of multiple playback machines, or the synchronizing of a playback machine with one or more record machines without the need for a playback signal processing unit.

SUMMARY OF THE INVENTION

The present invention provides for synchronization of recorder heads with particular tracks on a tape without the need for a playback signal processing unit. In accordance with the invention, a recognizable information pattern is included in the information recorded upon the record medium to indicate timing reference points in the information. The pattern is chosen so that even after the information is encoded for presentation to the medium, the pattern has a form that is recognizable whenever it appears in the information which flows from the medium. For example, if the data on the recording medium are broken up into fields, frames, or sectors or the like which are preceded by synchronizing information, the recognizable information pattern can be embedded into some of the synchronizing areas so that they are distinguished from other synchronizing areas within the medium.

The pattern selected is one that admits of detection without the need for decoding all of the information. Detection is effected by simple filtering. It is well known to utilize codes, such as the Miller Channel Code, wherein transitions in signal level identify the 1's and 0's of data bits. When such coded signals are recorded on magnetic tape and then reproduced to provide an electrical signal, the process is effectively analog, wherein zero crossings identify signal transitions, the sharp edges of the original pulses being removed by the frequency response of the recording and reproducing. In accordance with the present invention, the recognizable pattern is one that has a constant period and, hence, a constant fundamental frequency that can be selected by filtering.

During playback, signals flowing from the record medium are passed through a special filter which is designed to detect the above pattern and to generate an indication whenever the pattern appears in the outflowing information. The filter can be a sharply tuned analog band-pass filter used with a detector that responds to the prolonged presentation of that particular frequency by generating an indication. Ideally, the frequency selected is one that does not normally appear in the played back information.

In addition to simply detecting this pattern, it is also useful to utilize other properties of this pattern, such as the strength or magnitude of the signal having the pattern. This signal strength information can then be used to adjust the tracking of the scanning heads to maximize signal strength by centering the heads over the tracks. For example, the strength of the signal can be tested at different capstan phase positions, and then the capstan servo control can be adjusted to the phase setting that maximizes the strength of the signal. Other automatic capstan servo tracking techniques, such as dithering the capstan signal, and their associated apparatus are then not needed.

The timing of the indications, generated when the pattern is detected, is compared to the timing of reference timing signals that are derived from a studio reference signal or from another information source that is to be synchronized with the machine producing the indications. Any error in timing causes the capstan servo control system to operate in its usual manner to take whatever corrective action is required to achieve proper synchronization.

If the pattern chosen is of lower frequency than frequencies normally found in the information that flows from the media, then the pattern can be read reliably from the media by recording heads (used as playback heads) whose frequency response characteristics would not normally be adequate to recover the higher frequency components from the media. In this manner, the pattern may be used to synchronize tape editing operations where the record heads must be used as playback heads to synchronize the source and target machines, as was explained above.

In the specific case of an NTSC digital video casette recorder and player, both the audio and the video information are conventionally recorded onto diagonally scanned tracks. Six tracks are used for each field of video. Pairs of tracks are recorded and played back simultaneously, so it takes three scans of the tape to record the six tracks in each field of video. The information in each track is packaged into five sectors (two audio sectors, followed by one video sector, followed by two additional audio sectors). Each of these sectors of information begins with a synchronization preamble.

In a preferred embodiment of the present invention, the preamble preceding the very first audio sector which occurs on the first track of each unique video field is provided with a distinctive modified synchronization preamble which, after Miller Channel Code encoding, provides a strong component of a frequency that is distinct from and lower than the frequency which normally appears in preamble playback waveforms. This lower frequency is readily detected by simple analog filtering and detection circuitry connected directly to the playback signal. Its presence or absence, its timing, and its amplitude may thus be measured without the need for a playback signal processing unit.

The timing of the appearance of this lower frequency synchronization preamble in the playback signal indicates when a pair of playback scanning heads is starting to scan the first pair of tracks in a set of three pairs of tracks that define a complete video field. Capstan synchronization can be tested by determining whether the indication that this special preamble has been scanned occurs approximately at the appropriate time with respect to the vertical synchronization pulse provided by a stable reference source of video. If the wrong tracks are being scanned, then this indication will occur one-third or two-thirds of the way through a reference signal field.

A suitable preamble for sectors is normally constructed by subjecting the binary pattern 01010101 01010101 01010101 (AA, AA, AA hexadecimal repeatedly generated, with the least significant bit presented first) to the Miller Channel Code encoding process, thereby producing a symmetrical square waveform at one-fourth the data bit presentation rate. To distinguish the first sector on the track that appears at the start of each field from all other sectors, the alternative preamble pattern 01101101 10110110 11011011 (B6, 6D, DB hexadecimal repeatedly generated, with the least significant bit presented first) is utilized. After Miller Channel Code encoding, this pattern produces a symmetrical square wave at one-sixth the data bit presentation rate, it's period being six times the data bit period. Either of these waveforms could be used in assisting the playback circuitry to synchronize itself with the data flowing from the playback head, but the lower-frequency square wave is more readily reproduced by a recording head used in playback mode. In general, this modified preamble has no adverse effect upon the operation of digital video recorders.

A playback circuit designed in accordance with a preferred embodiment of the present invention includes band-pass filters and detectors connecting to the signal outputs of the two playback head amplifiers. The detector outputs signal the presence or absence of the special lower frequency pattern. The filters and detectors distinguish a prolonged, strong occurrence of the special lower frequency pattern from other chance occurrences of this pattern in the information parts of the playback signal and thus detect the special lower frequency pattern and generate an indication whenever a sector preamble containing such a pattern is played back. The indication terminates approximately when the preamble terminates, so its termination signals the approximate starting point of the information portion of the first sector on the first track in each field. The trailing edge of the indication may be used to indicate the positioning of the sectors on the track for editing purposes, particularly selective replacement of less than all the sectors on a given track. The approximate coincidence or noncoincidence of the indication with a reference vertical sync pulse indicates whether the capstan servo, set initially by reference to the control signal track, is causing the scanning heads to scan the proper tracks at the proper time. In a further aspect of the invention, an analog-to-digital convertor connected to the detector output generates a digital indication of the magnitude of the detected low frequency pattern, and this digital indication is used by computer-controlled signal processing to adjust the tracking of the scanning heads by introducing a corrective phase shift into the capstan servo control.

Accordingly, an aspect of the present invention is the development of a technique for synchronizing the playback of information from a record medium that does not require the information to be fully decoded, as through the use of a playback signal processing unit. A further aspect is the development of such a technique that is functional even when recording heads are used in a playback mode to achieve synchronization, as in the case of editing. Further aspects, objects and advantages of the present invention will be apparent from the following description, particularly when taken in conjunction with the accompanying drawings.

DESCRIPTION OF THE PREFERRED EMBODIMENT

The present invention will be described in the context of a digitized video casette recorder designed to record and reproduce NTSC digitized video and accompanying digitized audio.

The Recording of Digitized Video And Audio On Magnetic Tape

As part of the current trend towards digital signal processing, the television broadcast industry is moving from analog video and audio signal processing towards digital processing of both video and audio signals. International standards have been developed for interconnecting video signal processing components so that they may pass signals from one component to another in digital form. Digital video tape recorders are emerging that can digitize and record onto magnetic tape in data casettes both video and audio signals packaged into sectors having synchronizing preambles and containing error detection and correction information. These new digital video casette recorders and players resemble their analog counterparts in that they record information on helically scanned tracks and also use longitudinal tracks to record control, timing, and cueing information. They also resemble computer disk drives in their use of multiple sectors on each scanning track to contain the recorded digital information. The information stored on the helically scanned tracks contains both the audio and the video information, with separate sectors being used for the audio and video to facilitate the independent editing of each.

Because of the immense quantity of data which must be recorded, the new digital tape recorders leave no guard bands between adjacent helical tracks. Pairs of closely mounted heads scan pairs of tracks simultaneously, and the heads in each pair are twisted slightly in opposite directions (azimuth adjustment) to minimize the tendency of one playback head to pick up information from the adjoining tracks which contain information destined for the other head.

Figure 1:
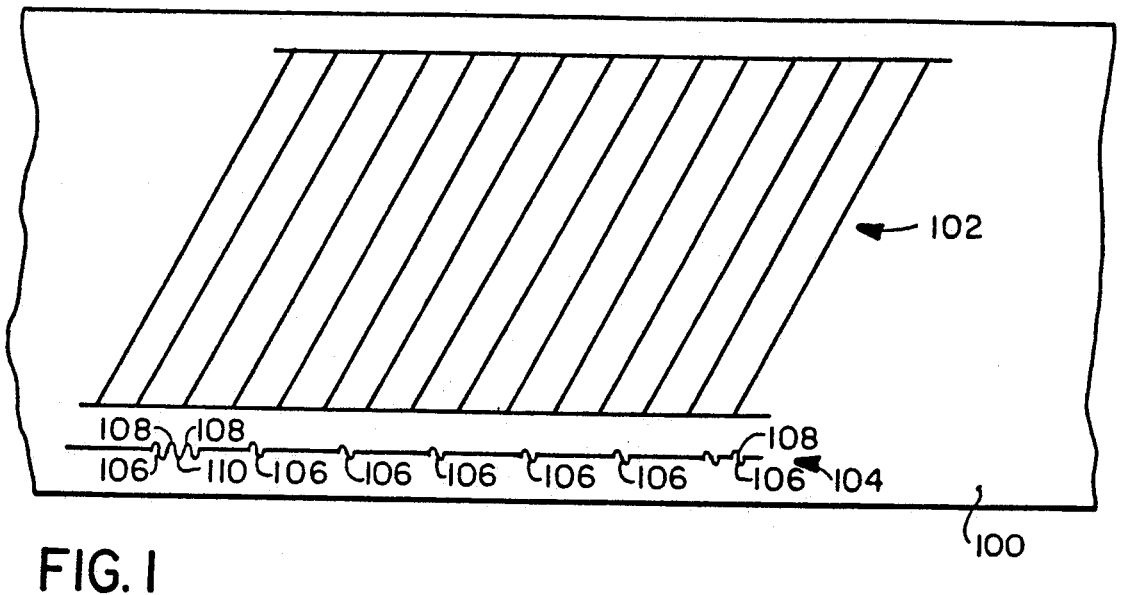
FIG. 1 illustrates diagrammatically the relative positions of the helical tracks and the longitudinal control track as conventionally disposed on magnetic tape encoded with digitized video and audio information, and also illustrates a well known signal content of the longitudinal control track.
Figure 2:
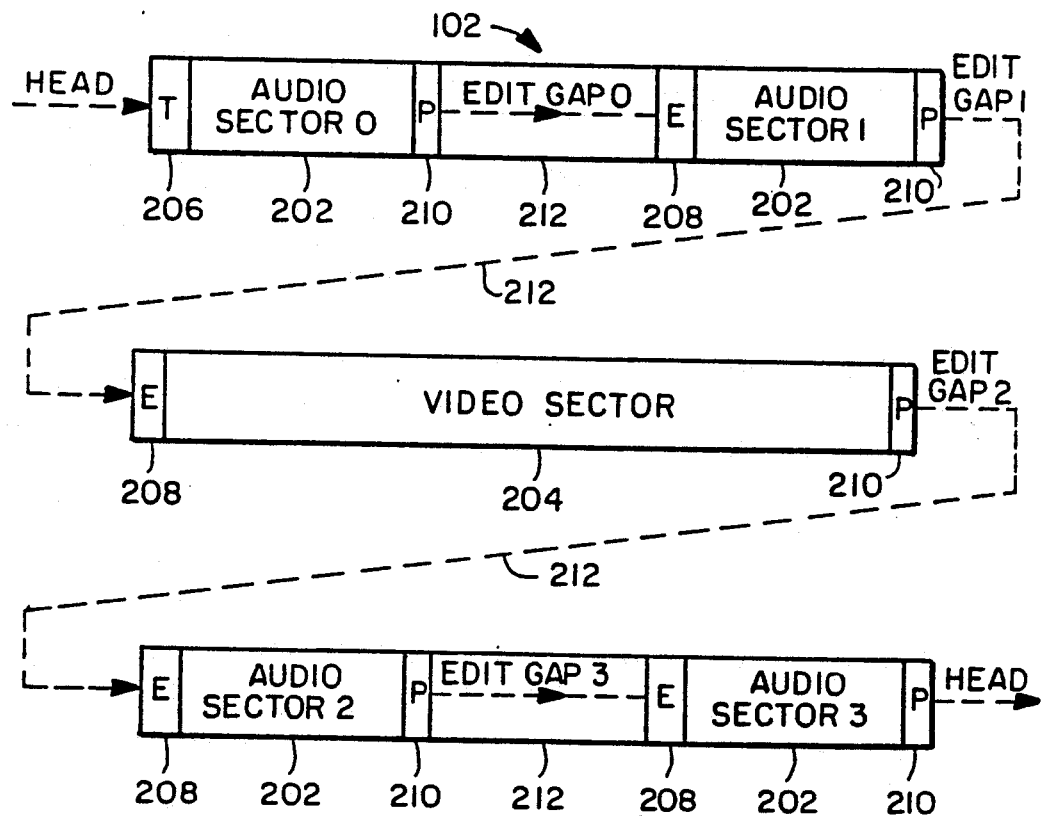
FIG. 2 illustrates the information content of a helically-scanned track, indicating the relative positions of the synchronizing preambles, the sectors, and the postambles as conventionally arranged in recording in accordance with FIG. 1.

FIGS. 1 and 2 illustrate how video and audio information is recorded digitally on magnetic tape in digital video cassette recorders. With reference to FIG. 1, the tape 100 is shown greatly enlarged. Helically scanned tracks are shown at 102 stretching diagonally across the tape 100, with the slope and width of the tracks greatly exaggerated for clarity. Pairs of closely spaced recording heads write on two tracks simultaneously. The recording head gaps are wider than the playback head gaps, so the writing of each track obliterates roughly half of the preceding track, leaving the tracks 102 closely spaced together with no guard bands separating adjacent tracks.

Beneath the helically scanned tracks there is a linear control signal track 104 that contains a single cycle pulse 106 for each pair of simultaneously recorded helical tracks 102. An extra single cycle pulse 108 appears below pairs of tracks at the start of each video frame making a two cycle pulse, and an additional extra single cycle pulse 110, making a three cycle pulse, appears below pairs of tracks at the start of each color video frame, which in the NTSC system occurs at the start of every other video frame.

The tracks 102 each contain sectors of information organized as is illustrated in FIG. 2. Each helically scanned track typically contains five sectors—two audio information sectors, one video information sector, and two more audio information sectors. Each track 102 begins and ends with two audio sectors 202, and the middle portion of each track contains a video sector 204. The sectors 202 and 204 include parity information, as for error detection and correction. Each sector 202, 204 is preceded by a preamble 206 or 208 and ends with a postamble 210, and the audio and video sectors are separated by edit gaps 212 that facilitate editing individual sectors on the track. A preamble 206 is the first preamble in respect to a track. Each preamble contains a repetitive pattern of information which enables the tape recorder playback circuitry to achieve synchronization with the data flowing from the track. The respective preambles include synchronization and identification data fields. With the exception of the preambles 206 and 208, the organization of the information within the sectors is not of concern for purposes of describing the present invention. Suffice it to say that each sector begins with synchronization and sector identification information which is followed by video or audio information encoded with error detecting information in a manner that has been standardized industry-wide to facilitate the movement of video cassettes between machines of different manufacturers.

The Miller Channel Code is based upon the self-clocking Miller code (often referred to as the Modified Frequency Modulation or MFM code) disclosed in Miller U.S. Pat. No. 3,108,261, wherein logical 1's are represented by signal transitions at the middle of a bit cell and logical 0's are represented by signal transitions at the edge of a bit cell; to avoid transitions less than one bit cell apart, the Miller code format suppresses an edge-cell transition following a mid cell transition. As the Miller code introduces an undesirable D.C. component into the resultant signal, the Miller Channel Code modifies the Miller code by additionally suppressing the mid-cell transitions preceding a suppressed edge-cell transition whenever such mid-cell transitions are the last of an even number of 1's following a 0.

The preferred embodiment of the present invention is designed for use in a recording system wherein the digital information to be stored on each track of the tape 100 is encoded in accordance with the Miller Channel Code.

Figure 3:
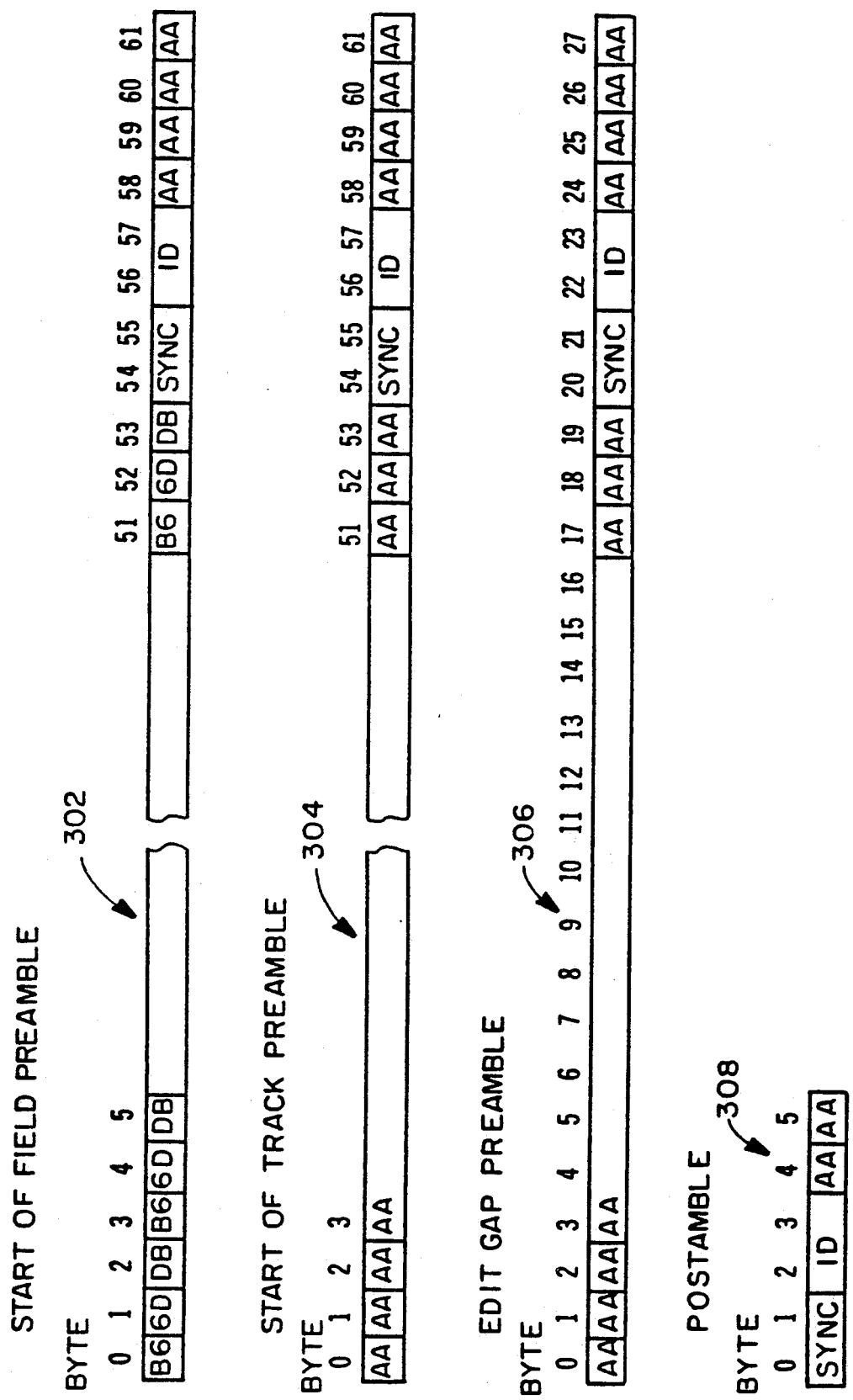
FIG. 3 illustrates the information content of the preambles and postambles and identifies the difference between the preamble used preceding the first sector in tracks containing the start of a new field, which contain a special pattern, and preambles used elsewhere in accordance with the present invention in recording on a helically-scanned track as shown in FIG. 2.

The sector preamble is designed to produce a timing signal upon playback that assists the playback circuitry in reaching synchronization with the data contained within each sector. FIG. 3 illustrates the data which comprise the sector preambles 206 and 208 and postambles 210.

In the preferred embodiment, the preambles 208 that follow the edit gaps 212 and that may be termed "Edit Gap Preambles" take the form illustrated at 306 in FIG. 3. The preambles 206 that start the tracks which begin each video field and that may be termed "Start of Track Preambles" take the form illustrated at 304 and are normally the same as the Edit Gap Preamble 306. The postambles 210 take the form illustrated at 308.

As illustrated in FIG. 3, the normal Start of Track Preamble 304 and the Edit Gap Preamble 306 begin with a series of bytes in the pattern AA hexadecimal. That is, the binary pattern of 8-bit bytes 01010101 01010101 (AA hexadecimal) with the least significant of the 8 bits leading is appended to the beginning of the preamble to each sector. This pattern is shown at 401 and 402 in FIG. 4. After Miller Channel Code encoding, this preamble produces in the signal that flows to the tape recording head a square wave 403 (FIG. 4) that fluctuates at one-fourth the basic data bit flow rate of the signal. This square wave serves as a synchronizing signal at the start of each sector which enables the playback circuitry to lock itself into synchronization with the information flowing from the playback head at the start of each sector even if the sectors are not spaced precisely predetermined distances from one another on the tape. The use of this sectored arrangement permits some sectors to be rewritten without disturbing other sectors.

Figure 4:
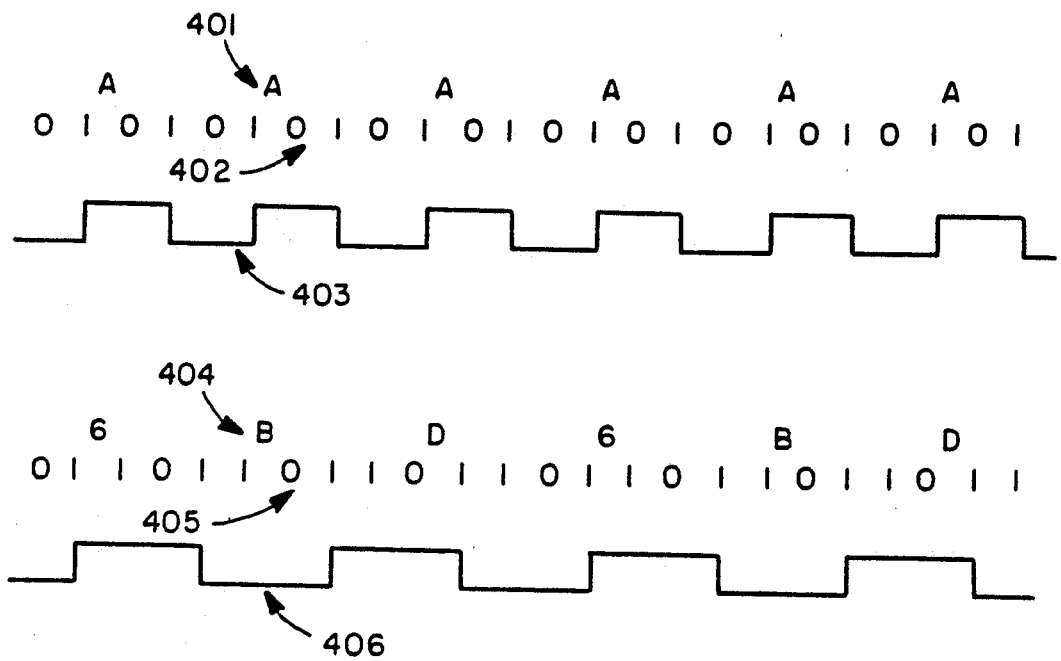
FIG. 4 illustrates the square waveforms that emerge when the two different types of preambles illustrated in FIG. 3 are subjected to Miller Channel Code encoding prior to being applied to the recording head.

When the track is one of the pair of tracks that falls at the start of a new video field, then the alternative recognizable information pattern in the Start of Field Preamble shown at 302 in FIG. 3 and at 404, 405, and 406 in FIG. 4 is selected. This pattern contains the hexadecimal characters B6, 6D, and DB repeated cyclically. Since the least significant bit is always transmitted first, this pattern results in the 8-bit data bytes being transmitted in the order indicated at 404 and in the bit pattern 01101101 10110110 11011011 which is shown at 405. After Miller Channel Code encoding, this information pattern produces a signal that is a square wave 406 having a frequency that is one-sixth the basic bit repetition rate—the lowest frequency that a Miller Channel Code encoded signal can generate. This is because the Miller Channel Code encoding scheme generates a signal transition for the first of a pair of isolated 1 bits but not for the second bit in the pair or for the 0 bit.

The Miller Channel Code encoding scheme can produce transitions spaced by only five diffent times; that is, bit spacing of 1, 1½, 2, 2½, and 3, the last being produced by repeated generation of the pattern 011. The likelihood of the occurrence of a long continuous series of transitions at the lowest frequency obtainable, namely one-sixth the basic bit repetition rate, is extremely low. Accordingly, this pattern, which is unique and easily recognized, can be used to signal the beginning of a new field of video information. Its termination, which coincides with the passage of the playback head away from the preamble and over the sector information that follows, can be used as a timing reference for editing purposes. Although it would be possible to create the same or slightly different regular transitions at low frequency, it is desirable to produce these synchronizing signals from a bit stream using the same channel code as used to encode the information bits. This admits of simple encoding by introducing the bits into the normal bit stream and maintains the clock pulses of the self-clocking code, as to promote proper timing.

Figure 6:
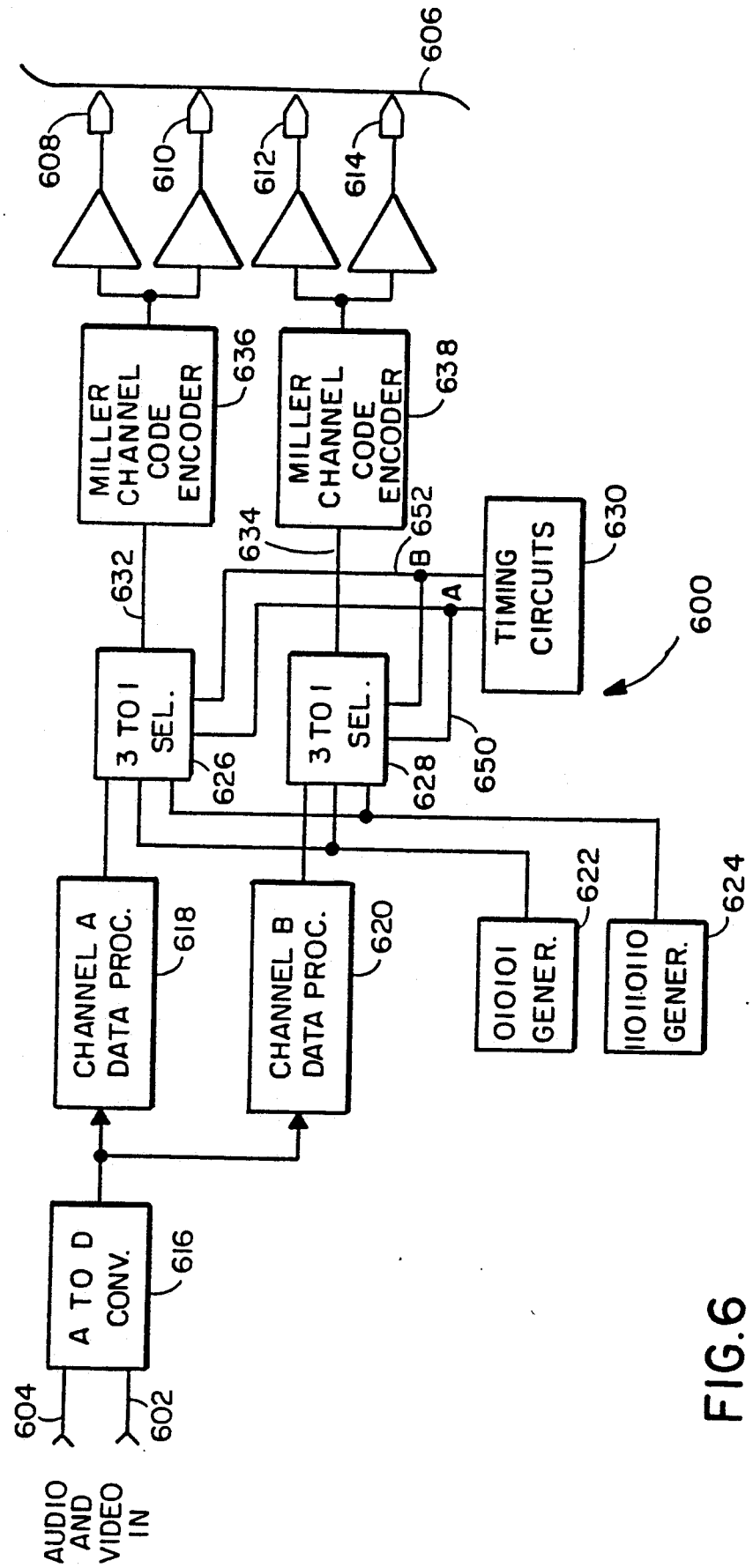
FIG. 6 is a diagrammatic illustration of preamble generation circuitry implementing a preferred embodiment of the present invention in a digitized video cassette recorder.

FIG. 6 illustrates apparatus for generating the preamble signal patterns that have just been described. A recording system 600 accepts analog audio and video signals at inputs 602 and 604, digitizes the signals, and records them on magnetic tape 606 that is stored within a digital tape cassette (not shown). Four recording heads 608, 610, 612, and 614 are included, mounted in pairs of two (608 and 612, for example, forming one pair, and 610 and 614 forming the other pair) which pairs are located 180 degrees apart on opposite sides of a rotating, drum-shaped scanner (not shown) about which the tape 606 is wound over an angle of slightly less than 180 degrees, as is conventional in professional video tape recorders. In the case of an NTSC signal, the scanner rotates 90 revolutions per second and thereby applies one or the other of the pairs of heads (608 and 612; 610 and 614) to the tape 606 at all times. The heads are displaced, but the information is delayed for the trailing head in such a way as to produce centered tracks on the tape 606. It takes one and one half revolutions of the scanner (not shown), or three head pair scans, or six tracks, to record a single field of video; and three revolutions or twelve tracks to record a single frame of two fields. The analog input signals are shown applied through an analog-to-digital convertor 616 to provide digitized information audio and video input signals. If the signals are already digitized when applied at imputs 602 and 604, there would be no need for the analog-to-digital convertor 616.

After the incoming analog video and audio signals are converted into digital signals by the analog-to-digital convertor 616, the digitized information is divided into two streams for parallel processing in channel A and channel B data processors 618 and 620 where the information is operated upon in any desired manner, which may be any of a number of well known manners, as by being shuffled, split into two data streams, combined with error detection and correction information, and reorganized into sectors in accordance with standards established by the industry. The information that flows from the data processors 618 and 620 is organized substantially in accordance with FIG. 2, and could include all the necessary sector preamble information organized as described above. However, to illustrate the present invention more clearly, the recording system is shown as having external generators 622 and 624 for generating the start of field preamble information patterns illustrated in FIGS. 3 and 4.

The generator 622 continuously generates the preamble pattern 01010101, and the generator 624 continuously generates the pattern 110110110110. A pair of three-to-one selectors 626 and 628 controlled by timing circuits 630 connect the signal outputs 632 and 634, respectively, of these selectors to the outputs of the data processors 618 and 620 at times when sector information is flowing from the processors 618 and 620, and the selectors 626 and 628 connect both the outputs 632 and 634 to the output of the generator 622, which generates the pattern 01010101, at times when sector preambles 304 and 306 are needed. But when a preamble 302 for the first sector in the first pair of tracks in a field is to be generated, the timing circuits 630 cause the selectors 626 and 628 to select the output of the alternative generator 624, which generates the pattern 10110110 to identify the start of the first sector in each video field.

The signal outputs 632 and 634 from the selectors 626 and 628 then flow through a pair of Miller Channel Code encoders 636 and 638 which encode the two signals in the A and B channels in a manner that minimizes high frequency components and also eliminates all direct-current components to improve the suitability of the signals for recordal on a magnetic medium. The encoded signals then flow through whichever pair of recording heads 608, 612, 610, 614 is against the tape 606 and from the heads onto the tape 606 in two tracks 102 that are recorded simultaneously.

It is essential that the waveforms 403 and 406 be distinguishable from each other in some simple manner, as by passing the signals through a simple band-pass filter and looking for a frequency component that appears in the one but not in the other. It is also essential that the waveforms 403 and 406 be equally suitable for use in synchronizing the playback circuitry. Within these limitations, waveforms with shapes different than those shown at 403 and 406 could be used to implement the invention in a different context.

Figure 5:
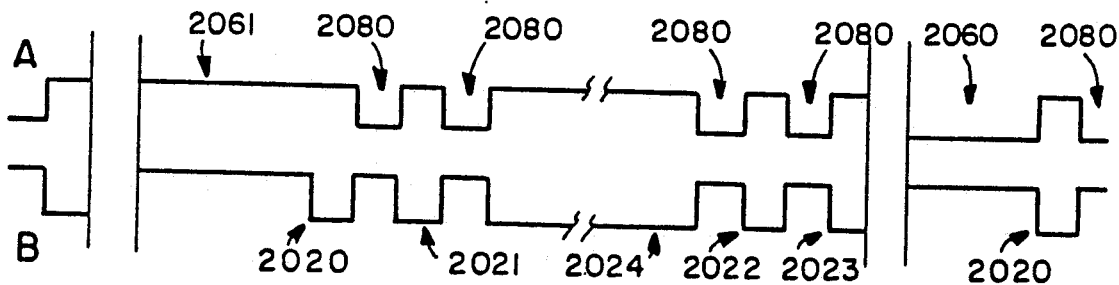
FIG. 5 is a plot of voltage against time for two signals A and B produced by the timing circuits shown in FIG. 6 to control selection of an appropriate preamble.

FIG. 5 depicts the fluctuation with time of enabling signals A and B which are respectively applied at 650 and 652 in FIG. 6 for controlling the operation of the selectors 626 and 628. These two signals permit the channel A and channel B data processors 618 and 620 to provide data to the tape heads when the signal A at 650 is high and the signal B at 652 is low. With reference to FIG. 2, the signals A and B are in this state when the audio sectors 202 and the single video sector 204 flow from the channel data processors 618 and 620. In FIG. 5, the times when the audio sectors are flowing from the channel data processors 618 and 620 is indicated at 2020, 2021, 2022, and 2023; and the time when the video sector flows from the processors 618 and 620 is indicated at 2024.

Normally, during a sector preamble time interval, the signal A is low and the signal B is high, as is indicated at 2080 and 2060 in FIG. 5. The low A signal 650 and high B signal 652 causes the selectors 626 and 628 to select the output of the 010101010101 generator 622 and to feed this signal through the Miller Channel Code encoders 636 and 638 to the tape 606, producing the preamble waveform shown at 403 in FIG. 4. During the time interval 2061 in FIG. 5, when the preamble for the first sector in a video field is presented, both the A and B signals are high, and the 011011011010 generator 624 is selected instead of the 010101010101 generator 622, producing the preamble waveform shown at 406 in FIG. 4. In this manner, a unique sector preamble waveform, containing a strong signal component at precisely one-sixth the data bit presentation rate, identifies the start of the first track and sector in each video field, and the trailing edge of this preamble waveform marks the position of the start of the information portion of this first sector on the tape 606.

Detecting the Pulse at the Start of Each Frame

Figure 7:
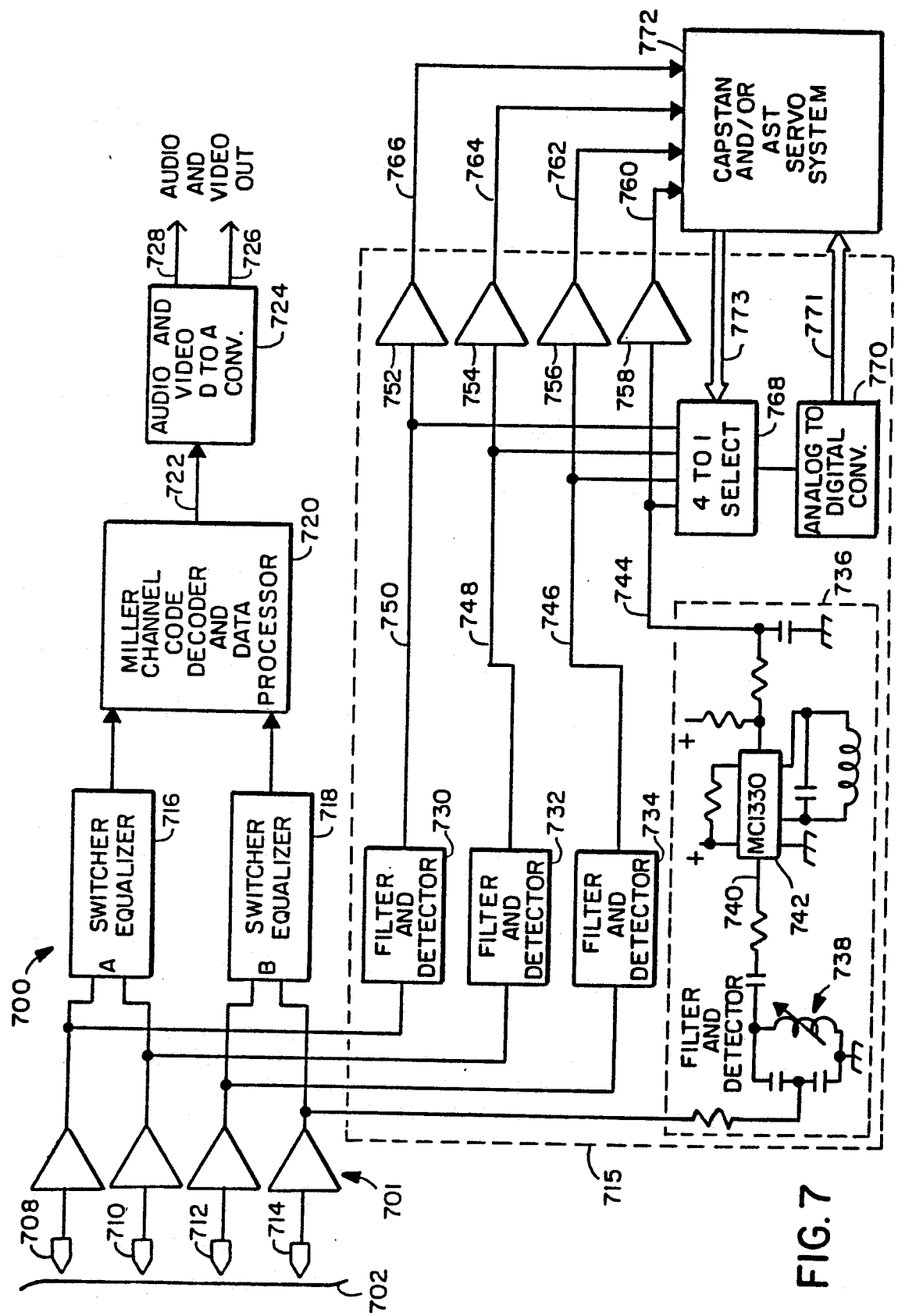
FIG. 7 is a diagrammatic illustration of playback circuitry implementing the pattern detection and indication generation features of the present invention in a digitized video, cassette recorder.

FIG. 7 illustrates how the unique start of field preamble pattern may be retrieved, identified, and utilized during playback to generate an indication for establishing proper synchronization.

Signals are picked up from a tape 702 by means of pairs of playback heads 708, 712 and 710, 714 mounted on opposite sides of the spinning scanner (not shown) and, in the preferred embodiment of the invention, with the playback head pairs 708, 712 and 710, 714 positioned 90 degrees away from the recording head pairs 608, 612 and 610, 614 described above. In the case of some editing operations, the recording heads 608, 612 and 610, 614 may themselves be used as the playback heads. For example, when a segment is to be edited, the recording heads are used as playback heads during the process of searching for the sector that is to be rewritten, and they are then then used as recording heads to rewrite the sector. The playback heads are too far removed from the recording heads to be useful for positioning the recording heads. Unfortunately, since the recording head gaps are considerably wider than the playback head gaps, they cannot reproduce the most rapidly fluctuating signal components with full fidelity, and so it is difficult to use the recording heads for searching. By providing a lower frequency signal component that recording heads used as playback heads can reproduce accurately and can search for to locate the precise start of the first sector in each field, the present invention facilitates this use of the recording heads for head positioning.

As in the case of the recording heads described at an earlier point, the playback heads 708, 712 and 710, 714 are physically mounted in pairs so that only two of them are actually against the tape 702 at any given time. The signals produced by the active pair 708, 712 or 710, 714 are amplified by amplifiers 701 and applied to channel A and B switcher equalizers 716 and 718 of a playback signal processing unit 700. The switcher equalizers 716, 718 select the active pair of heads and then equalize and stabilize the two signals flowing from the two tracks 102 (FIG. 1) currently being scanned on the tape 702. The two signals then flow through a Miller Channel Code decoder and data processor 720 which extracts the information from the sectors, performs any necessary error checking, error correcting, and filtering, unshuffles the information, combines the two streams, and then reproduces the audio and video streams of information in a digital form suitable for utilization by other studio devices at 722. If analog signals are required, the digital signal at 722 is passed through appropriate audio and video signal digital-to-analog convertors 724 which then produce analog audio and video output signals 726 and 728.

The signals captured by the playback heads 708, 712 and 710, 714 are fed to filters and detectors 730, 732, 734, and 736 of a pulse detector and A-D convertor 715. The filters and detectors 730, 732, 734, 736 are designed to detect the special pattern represented by the waveform 406 (FIG. 4) and thereby generate an indication in the form of a signal pulse as the first audio sector in each video field flows from the tape 702. Each filter and detector 730, 732, 734, 736 contains a resonant circuit 738 which is precisely tuned to one-sixth the bit presentation rate—the rate at which the waveform 406 fluctuates. In the preferred embodiment of the invention, the resonant circuit 738 has a one megacycle bandwidth which gives it a one-half microsecond rise time response rate. This is fast enough to generate a reasonably sharp indication pulse whose trailing edge identifies the moment relative thereto when the data portion of the first sector on the first track in a video field begins to flow from the tape 702. The signal output 740 from the resonant circuit 738 flows into a detector 742 which generates at 744 an analog signal pulse whose amplitude is proportional to the strength of the signal components, whose frequency is one-sixth the bit presentation rate, that flows from the respective playback head 714.

The analog signals 744, 746, 748, and 750 from filters 736, 734, 732 and 730 pass through respective amplifiers 758, 756, 754, and 752 which may be Schmitt trigger amplifiers adjusted to give a high output when the input signal passes a pre-set threshold level (which may be adjustable) and to give a low output when the input signal falls below that level (or an even lower pre set level). In this manner, one of the amplifiers 752, 754, 756, and 758 generates a square digital pulse at the start of each frame, with the trailing edge of the pulse signalling the position of the start of meaningful data within the first audio sector on the first pair of tracks for each field. The resulting signals 760, 762, 764, and 766 are then fed into a capstan and/or AST (automatic scan tracking) servo system 772 where they are used along with other information, including that derived from the longitudinal control track 104 (FIG. 1), to control the operation of the capstan drive and/or the AST servo system which together position the playback heads precisely over the playback tracks.

The analog signals 744, 746, 748, and 750 are also passed through a 4-to-1 select gate 768 which selects one of the signals under the control of the system 772 over a line 773. The selected signal is then digitized by an analog-to-digital convertor 770, and the digitized value of this signal is then presented over a line 771 to the system 772 as an 8-bit binary number. The digitized value indicates the magnitude of the pulse or the strength of the indication. The system 772 can use this value in conjunction with the AST system and capstan servo system to position the playback heads correctly over the tracks on the tape by testing the magnitude of this value at different head positions and then selecting the head position that maximizes this value.

Using the Frame Indication Pulse To Control Capstan Synchronization

The prior art contains many examples of systems that can synchronize the operation of a capstan drive with the playback of video information from tape. It also contains many examples of automatic tracking adjustment systems. These conventional systems are well known to those skilled in the art, and they need not be described in full detail here.

Figure 8:
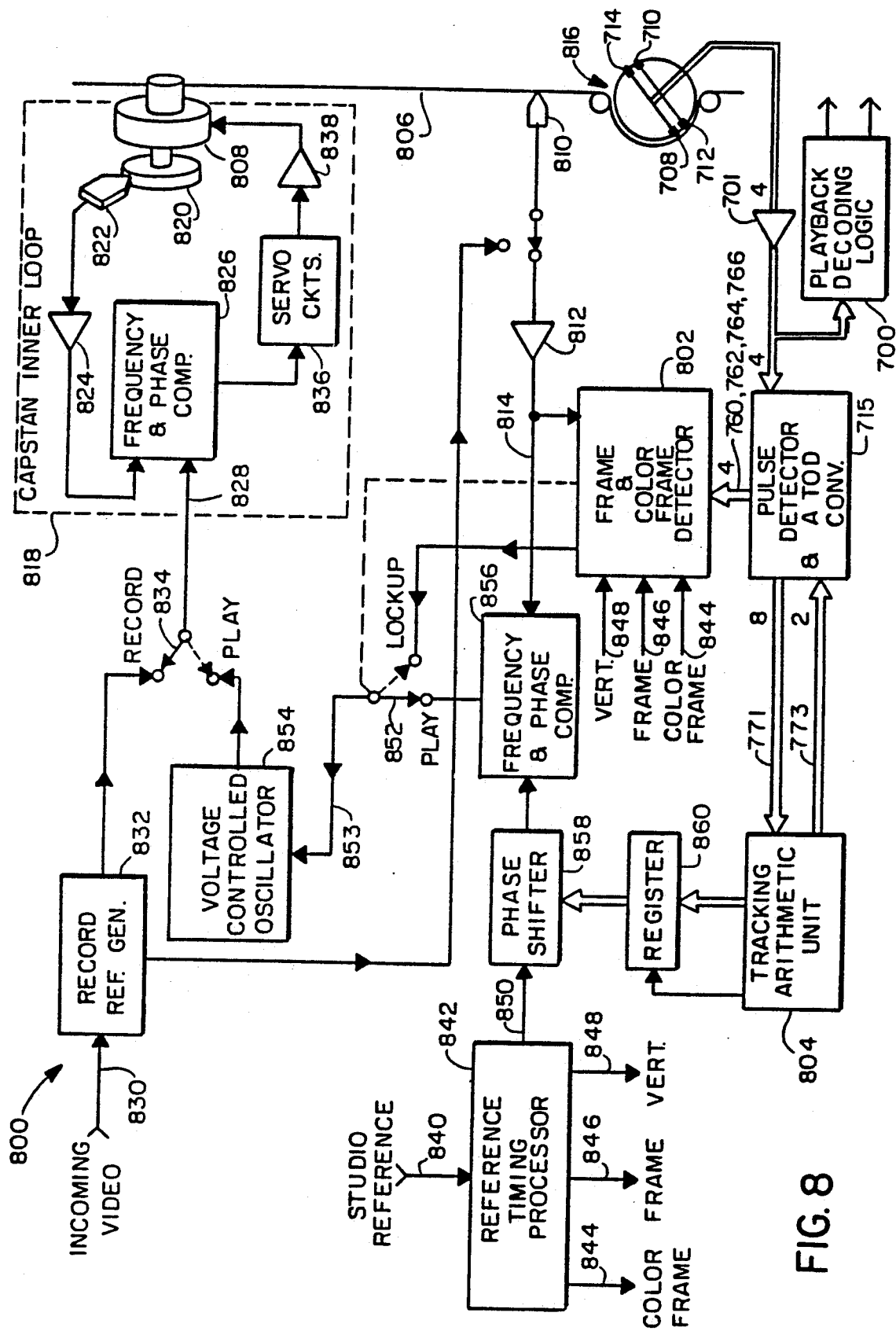
FIG. 8 is a diagrammatic illustration of a capstan servo control system for a digitized video casette recorder designed in accordance with the present invention and containing the filter and detector elements of the invention shown in FIG. 7.

The present invention, in two of its aspects, can be included in an otherwise conventional automatic capstan synchronization and tracking adjustment system such as that illustrated in FIG. 8, by modifying the conventional system in three respects. First, the pulse detector and analog-to-digital convertor 715 shown in FIG. 7, which presents the frame indication pulses, is added to the system. Second, the frame and color frame detector 802 is reprogrammed so that after it achieves the best possible capstan synchronization in a conventional manner, using signals derived from the control track, it then further adjusts the capstan synchronization to bring the frame synchronization pulses into approximate synchronization with the reference vertical to insure that the playback heads are properly positioned over the proper pair of tracks. And third, the tracking arithmetic unit is modified to adjust tracking by maximizing the amplitude of the frame indication pulses rather than by minimizing the amplitude of an extracted dither signal as in conventional system designs. The second and third modifications may be used together, as illustrated, or they may be used independently of each other.

The following discussion focuses upon the second and third modifications and how they may be realized in an otherwise conventional system.

FIG. 8 illustrates a digital video tape recorder capstan servo control system 800. The system 800 is a transport for the magnetic tape 806 which is presumed to move upward as shown in FIG. 8, driven by a capstan drive 808 and by a takeup mechanism (not shown). The information in a control track on the magnetic tape 806 is sensed by a record/playback head 810 which captures a control signal and present it to an amplifier 812 so that an amplified control signal is applied to a line 814. A helical scanning assembly 816 has mounted upon its surface the four playback heads 708, 710, 712, and 714, which are attached to associated amplifiers 701 the outputs of which are fed into the pulse detector and A-D convertor 715 the details of which are shown in FIG. 7 as described above.

The speed of the capstan drive 808 is controlled primarily by a capstan inner loop circuit 818 which is of conventional design. See, for example, pages 15.102 to 15.106 of TELEVISION ENGINEERING HANDBOOK by K. Blair Benson (McGraw Hill 1986). Very briefly described, the capstan motor 808 has attached thereto a high resolution tachometer assembly 820. The tachometer assembly 820 generates pulses which are detected by a magnetic or optical detector 822 and which are amplified by an amplifier 824 and fed into a frequency and phase comparator 826. A reference source of pulses 828 derived from an incoming video signal 830 by a record reference generator 832 (with a switch 834 in the "record" position) is also fed into the frequency and phase comparator 826. Any error is fed through servo circuits 836 and a motor control amplifier 838 to the power input of the capsan drive 808. The capstan inner loop thereby causes the speed of the capstan to be controlled precisely by the speed at which the reference pulses 828 arrive.

During playback, a studio reference video signal 840 is fed into a reference timing processor 842 which generates timing signals for the system 800. Included is a color frame timing signal 844, a frame timing signal 846, and a vertical timing signal 848. All of these timing signals are fed to the frame and color frame detector 802.

Figure 9:
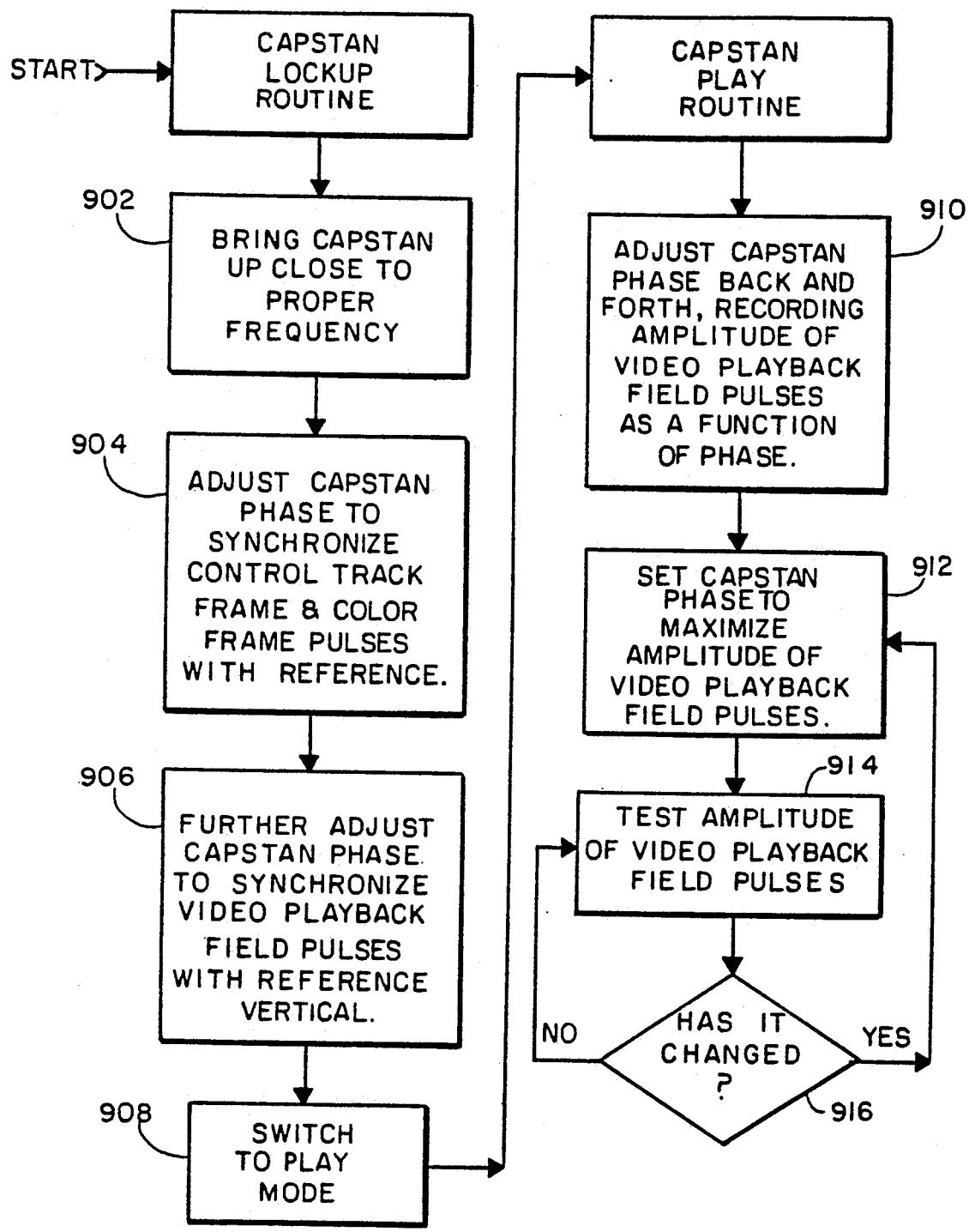
FIG. 9 is a flowchart illustrating the operation of the frame and color frame detector and the tracking arithmetic unit shown in FIG. 8.

When the system 800 is first started up in playback mode, a switch 852 controlled by the frame and color frame detector 802 is in the lockup position so that a voltage controlled oscillator 854 is controlled by the frame and color frame detector 802. The switch 834 is placed in the play position, so the capstan inner loop 818 is provided with pulses from the voltage controlled oscillator 854, which is of conventional design. By varying the magnitude of the voltage applied to the line 853, the detector 802 can cause the rate of the oscillator 854 to increase or decrease and thereby cause the capstan drive 808 to rotate more rapidly or more slowly. Initially, these pulses are chosen to cause the capstan 808 to accelerate rapidly up to its normal operating speed. As shown in FIG. 9, the frame and color frame detector 802 includes a controller programmed (in either hardware or in software or both) so that it first brings the capstan drive 808 up to near its proper operating frequency (step 902 in FIG. 9). Next, the detector 802 checks the control signals on the line 814 (the waveform of the control signal is illustrated at 104 in FIG. 1) and compares the timing of the characteristic frame and color frame pulses in the control signal 814 to the timing of the frame and color frame signals 844 and 846 (step 904).

The detector 802 permits the phase of the capstan 808 to shift until the frame and color frame signals presented by the control signal 814 and derived from the magnetic tape 806 match those produced by the reference timing processor 842 from the studio reference 840. These are all conventional steps carried out in a conventional way to achieve approximate synchronization of the capstan through use of the tape's control signal track.

The narrowness of the diagonal tracks on the tape 806 requires that a further phase adjustment be carried out—one that would normally require the services of a playback signal processing unit, as has been explained. This final adjustment insures that the playback heads 708, 710, 712, and 714 are positioned over over the proper pair of tracks, and not over an adjacent pair of tracks.

Accordingly, and in accordance with the novel teachings of the present invention, field indication pulses detected by the pulse detector 715 are fed over the lines 760, 762, 764, and 766 (or over a single line containing all the pulses received) to the frame and color frame detector 802 so that their timing may be compared with that of the vertical timing signal 848. By further adjusting the signal applied to the voltage controlled oscillator 854, the detector 802 fine tunes the phasing of the capstan 808 until the time relationship between the vertical pulse 848 and the field indication pulses presented by the pulse detector and A-D converter 715 are properly synchronized (step 906).

The system 800 then switches into play mode (step 908) through actuation of the switch 852 by the frame and color frame detector 802, as is conventional in video tape recorders switching from lockup into play mode.

A frequency and phase comparator 856 now takes over the task of synchronizing the magnetic tape 806 transport with the studio reference 840. The control signal 814 is fed into one input of the frequency and phase comparator 856, and the control signals generated by the reference timing processor 842 and applied to a line 850 after being derived from the studio reference 840 are fed into another input of the frequency and phase comparator 856, but only after passing through a phase shifter 858 that is controlled by a tracking arithmetic unit 804. This conventional capstan control arrangement is further described on pages 15.102 to 15.106 of K. Blair Benson, *Television Engineering Handbook* (McGraw-Hill, 1986). The amount of phase delay introduced by the phase shifter 858 is adjusted by the contents of a register 860.

The tracking arithmetic unit 804 adjusts the phase value in the register 860 to adjust the capstan phase back and forth while simultaneously monitoring the amplitude of the video playback field indication pulse which is presented in digitized form over the signal lines 771 by the indication pulse detector and A-D converter 715 (step 910 in FIG. 9). The tracking arithmetic unit 804 is thereby able to determine how the magnitude of the special frame pulses varies as the phase of the capstan motor 808 is altered. The tracking arithmetic unit 804 then chooses as the proper value for placement in the register 860 the value which maximizes the magnitude of the indication pulses and thereby assures that the playback heads 708, 710, 712, and 714 are properly centered over the helical tracks on the tape (step 912 in FIG. 9). The tracking arithmetic unit 804 then proceeds to monitor the amplitude of the video playback field pulses presented by the line 771 to see if they remain stable in amplitude or if their amplitude goes up or down (step 914). If the amplitude of these pulses changes (step 916), the arithmetic tracking unit 804 readjusts the capstan phase to maximize the signal (step 912). In this manner, the playback heads are maintained over the center of the tracks which they must scan for the duration of the playback session.

In prior designs, automatic tracking has been realized by introducing a low frequency dither signal of about 10 cycles per second into the operation of the capstan motor 808. A very sharp 10 cycle per second band-pass filter can capture this signal from the output of the playback heads. A product detector can then multiply the playback signal by a 10 cycle per second reference signal and thereby derive an error signal which indicates whether the playback heads are off center and to which side the playback heads are off center. See K. Blair Benson, *Television Engineering Handbook* (McGraw Hill 1986), pages 15.111 to 15.113. The present invention is able to achieve the same result without the need for a dither signal, which can introduce distortion into the audio tracks of the recorded information and also interfere with other servo operations. It also does without the need for a sharp low-pass filter and product detector. The presence of a well defined, fixed-amplitude, easily detectable pulse thus simplifies the automatic adjustment of tracking in a recording system design in accordance with the present invention.

While not shown in FIG. 8, the system 800 includes an AST (automatic scan tracking) system that positions the playback heads 708, 710, 712, and 714 over the tracks by means of bandable bimorphs or similar actuators upon which the playback heads are mounted. See, for example, K. Blair Benson, *Television Engineering Handbook* (McGraw Hill 1986), pages 15.113 to 15.119. Tracking adjustment can also be carried out by the AST system, which can respond more rapidly than the capstan servo system. In general, both the capstan servo system and the AST system would be jointly used to detect and correct tracking errors in the manner just described.

Transferring Information Between Sources and Recorders

Figure 10:
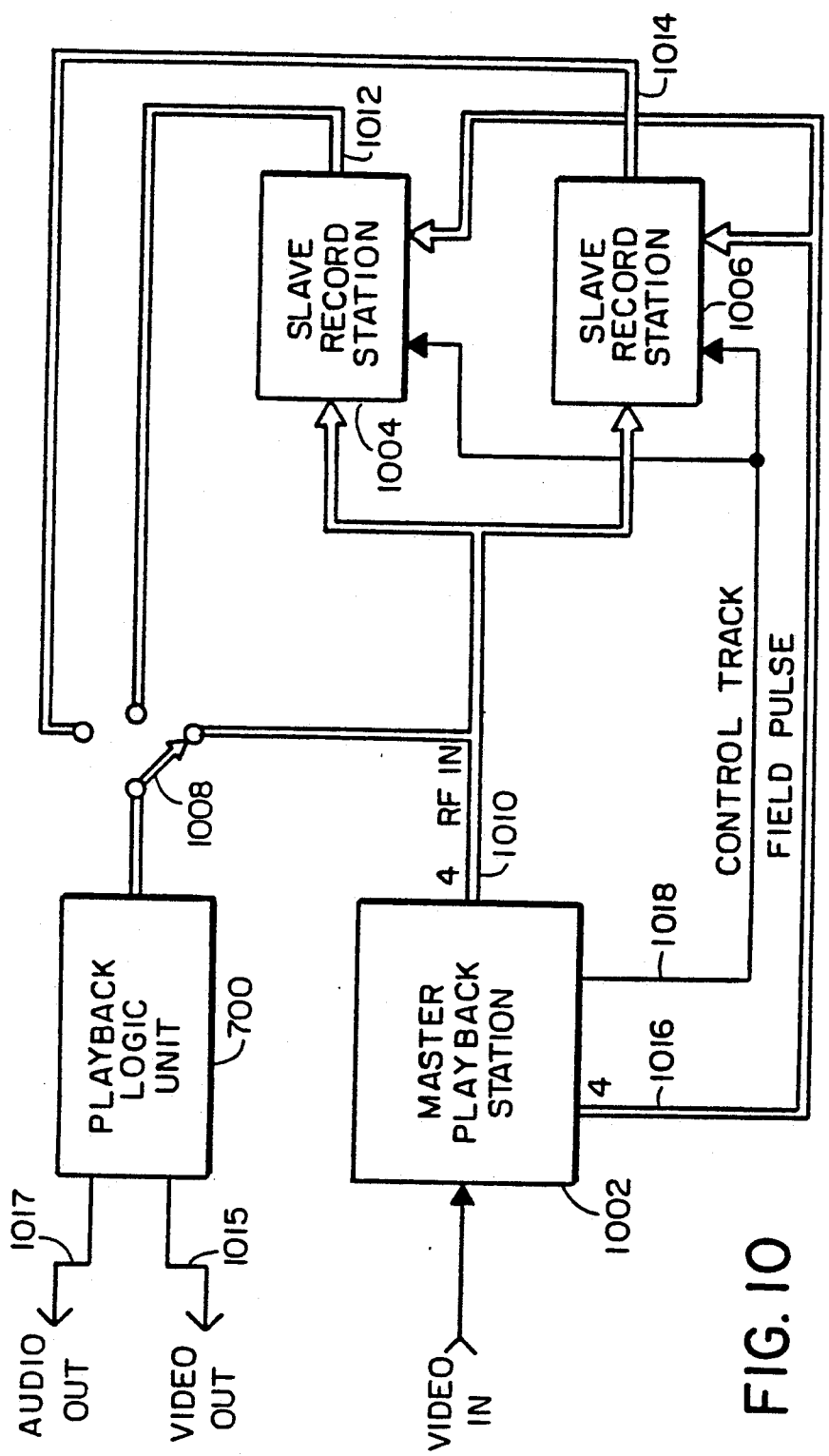
FIG. 10 is a diagrammatic illustration of how a master playback station may control the operation of two slave recording stations sharing a single playback signal processing unit utilizing the present invention.

FIG. 10 illustrates another use of the present invention. A master playback station 1002 is shown coupled to a pair of slave recording stations 1004 and 1006. As an alternative to providing a separate playback signal processing unit for each of the three stations, a single playback signal processing unit 700 is shared by all three stations and is arranged by means of a switch 1008 to connect to any one of the three. The playback output signals 1010, 1012, and 1014 of the three stations are routed to the switch 1008 so that a video output signal 1015 and an audio output signal 1017 (or their digital equivalents) may be derived from playback of any of the three stations. While not shown in FIG. 10, other information concerning the identity of the information flowing from the playback signal processing unit 700 (field count, segment count) can also be presented by the unit 700.

The master playback station 1002, in addition to providing four playback signals 1010 from its four playback heads, also provides the four field (NTSC signal) indication pulses 1016 which are generated by an indication pulse detector and A-D converter 715 (FIGS. 7 and 8) within the playback station 1002, and also a control track signal 1018 which is derived from the control track of the tape being played back by the master playback station 1002.

Figure 11:
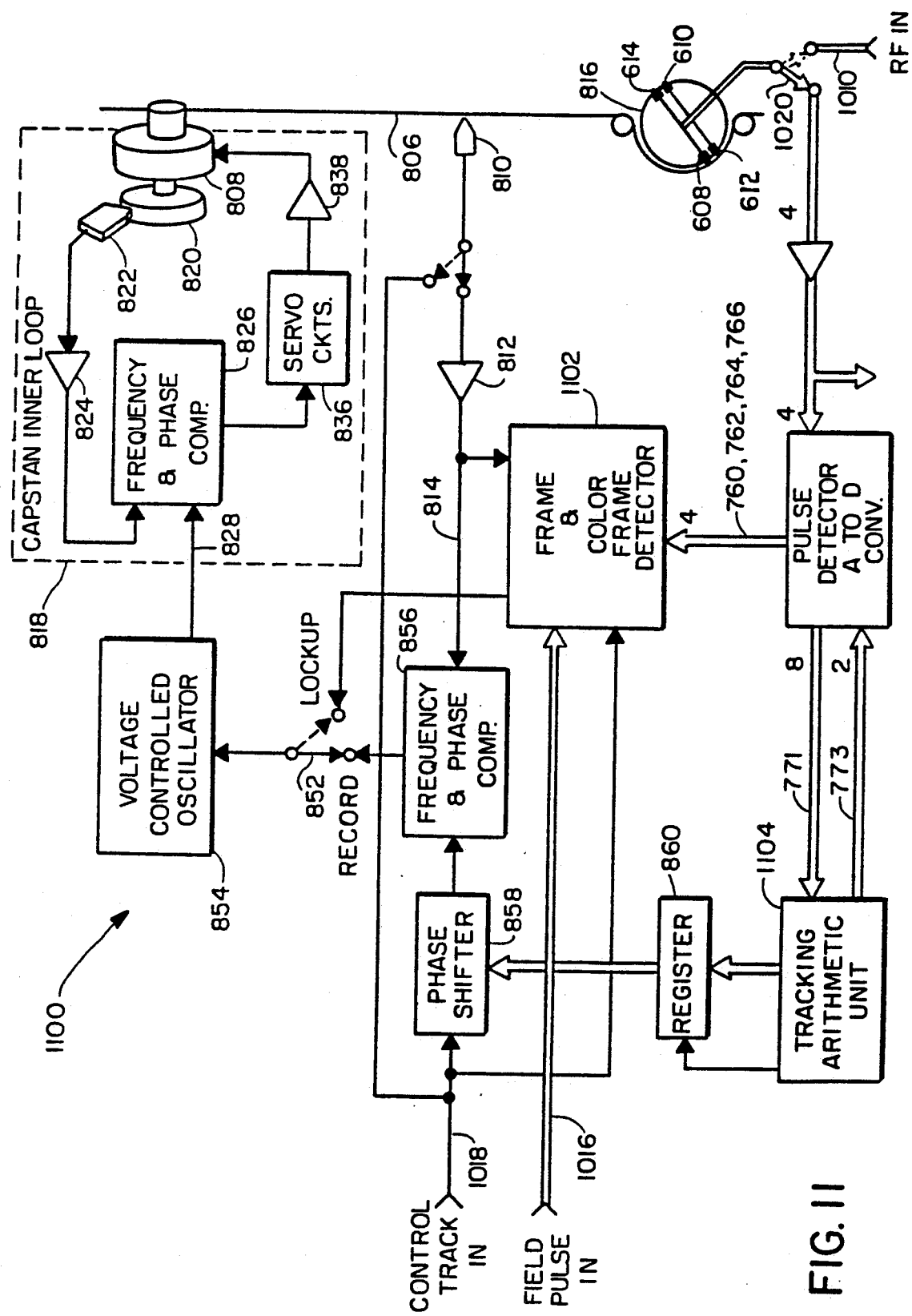
FIG. 11 is a diagrammatic illustration of the capstan servo control system for the slave record stations shown in FIG. 10.

In accordance with the teachings of the present invention, the four playback signals 1010, four field pulse signals 1016, and single control track signal 1018 are fed into the slave recording stations 1004 and 1006. FIG. 11 illustrates the modified capstan control system 1100 which is utilized within each of the slave record stations 1004 and 1006 to control their operation. Those portions of the capstan control system 1100 which correspond precisely to the elements of the capstan control system 800 (FIG. 8) are numbered with the same reference numbers as are shown in FIG. 8 and need no further explanation.

Instead of the capstan control system 1100 receiving a studio reference signal 840 (FIG. 8), the capstan control system 1100 receives the field pulses 1016 and the control track signal 1018 from the master playback station 1002 shown in FIG. 10. The control track signal 1018 is fed directly into the phase shifter 858, passing through it and into the frequency and phase comparator 856.

A frame and color frame detector 1102 operates like the frame and color frame detector 802 (FIG. 8). During lockup, after bringing the capstan up close to the proper frequency (step 1202 in FIG. 12), the frame and color frame detector 1102 compares the control track signals 1018 of the master station and the signals 814 from the slave station and adjusts the capstan to synchronize them (step 1204 in FIG. 12). The detector 1102 next compares the timing of the field indication pulses 1016 from the master station with those 760, 762, 764, and 766 from the slave station and adjusts the capstan to synchronize them (step 1206 in FIG. 12).

The system 1100 then switches into play mode (step 1208 in FIG. 12) through actuation of the switch 852, and the frequency and phase comparator 856 takes over the task of controlling the capstan drive 808. A tracking arithmetic unit 1104 operates like the tracking arithmetic logic unit 804 (FIG. 8). The tracking arithmetic unit 1104, by placing values in the register 860 that cause the phase shifter 858 to alter the timing of the control track signals 1018 coming from the master station, adjusts the tracking to maximize the gain of the signals picked up by the playback heads 708, 710, 712, and 714, as has been explained in connection with FIG. 8.

Figure 12:
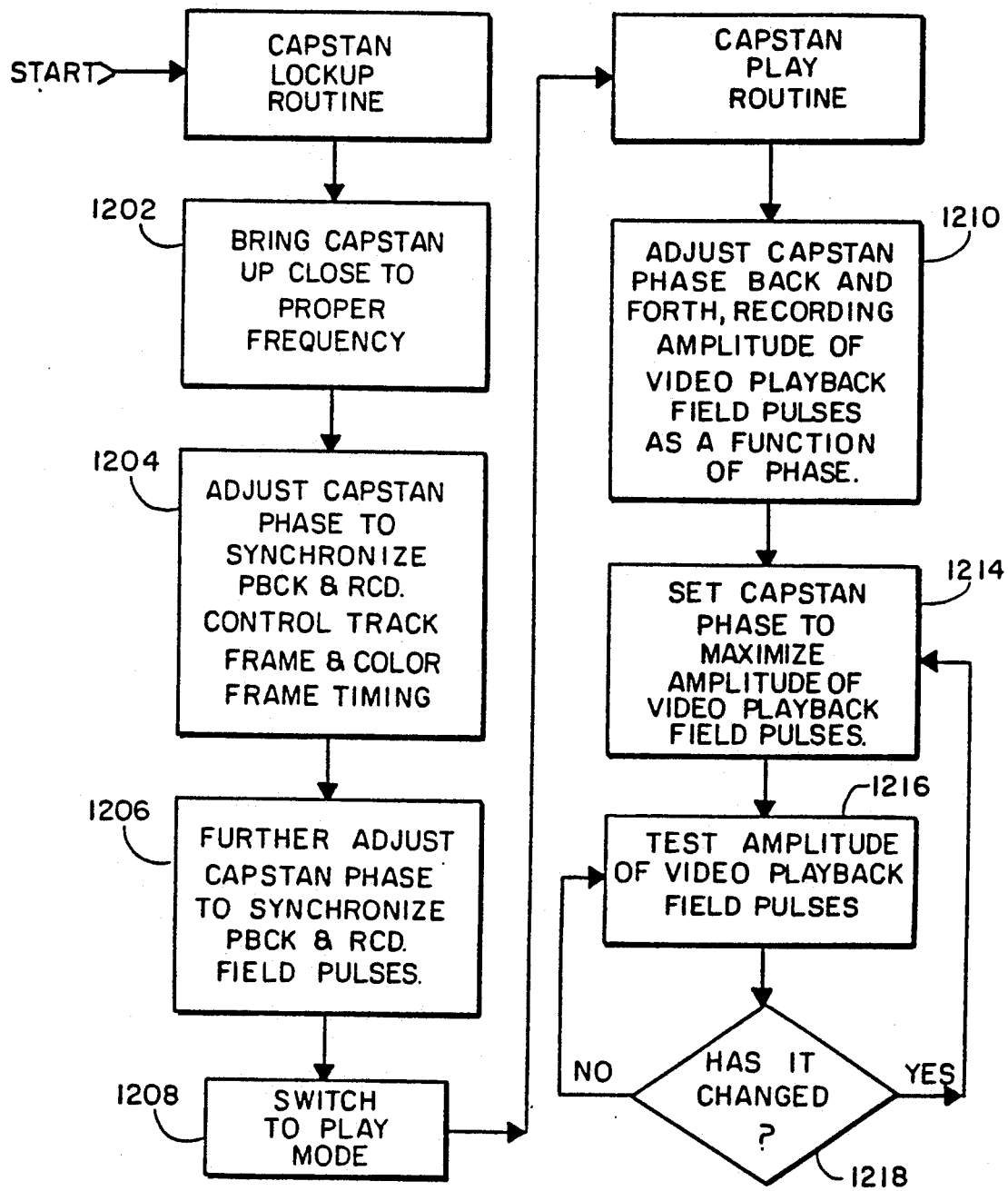
FIG. 12 is a flowchart illustrating the operation of the frame and color frame detector and the tracking arithmetic unit shown in FIG. 11.

The tracking arithmetic unit 1104 adjusts the phase value in the register 860 to adjust the capstan phase back and forth while simultaneously monitoring the amplitude of the video playback field pulse which is presented in digitized form over the signal lines 771 by the pulse detector and A-D converter 715 (step 1210 in FIG. 12). The tracking arithmetic unit 1104 is thereby able to determine how the magnitude of the special frame pulses varies as the phase of the capstan motor 808 is altered. The tracking arithmetic unit 1104 then chooses as the proper value for placement in the register 860 the value which maximizes the magnitude of the pulse and thereby assures that the playback heads 708, 710, 712, and 714 are properly centered over the helical tracks on the tape (step 1214 in FIG. 12). The tracking arithmetic unit 1104 then proceeds to monitor the amplitude of the video playback field pulses presented by the line 771 to see if they remain stable in amplitude or if their amplitude goes up or down (step 1216). If the amplitude of these pulses changes (step 1218), then the arithmetic tracking unit 1104 readjusts the capstan phase to maximize the signal (step 1214). In this manner, the playback heads are maintained over the center of the tracks which they must scan for the duration of the playback session. In general, the AST system may also play a role in tracking adjustment, as has been explained above in connection with FIG. 8.

In this manner, even without the use of the playback signal processing unit 700 (FIG. 10), the playback operation of the slave record stations 1004 and 1006 are synchronized with those of the master playback station 1002 closely enough so that digitized information stored in sectors on the helical tracks of the magnetic tape in the master playback station may be fed directly over the lines 1010 to either of the slave record stations 1004, 1006 and recorded directly over the corresponding sectors on the helical tracks of the tape 806 within the respective slave record station 1004, 1006. Either audio or video segments may be selectively replaced in this manner without disturbing other existing material on the magnetic tape of the slave station. The playback signal processing unit 700 (FIG. 10) may be switched by means of the switch 1008 to monitor and decode the output of any of the three stations 1002, 1004, and 1006, and three separate playback signal processing units are not required.

The heads 608, 610, 612, and 614 shown in FIG. 11 are not the playback heads but are the record heads of the slave record station 1004 or 1006. A switch 1020 permits these record heads to be connected to the pulse detector and A-to-D converter 715 during times when the slave record station 1004 or 1006 is being synchronized with the master playback station 1002 and to be then switched to connect the four record heads 608, 610, 612, and 614 to the lines 1010 emanating from the master playback station 1002's playback heads when new information is to be applied to the recording tape 806. In this manner, precise synchronization for recording is achieved in an editing environment. The lower frequency of the field indication pulse signal (in comparison to typical playback signals) makes it possible for recording heads with gaps wider than playback head gaps to recover the field indication pulse from the tape and present it to the pulse detector and A-to-D converter 715. If the playback signal processing unit 700 were connected to the record heads in an effort to determine synchronization, the playback signal processing unit 700 might not produce an intelligible result because of high frequency degradation due to the extra width of the recording head gaps.

The signal lines 1010 are shown flowing directly from the playback heads of the master playback station 1002 to the record heads of the slave stations 1004, 1006. It is to be understood that these signals would pass through amplifiers and wave shapers, and that it might be necessary to extract a clock signal from the signals and to use the clock signal to extract the digital information from the sectors so that clean digital signals defining the sector information would flow across to the slave record stations 1004 and 1006. The steps of demodulation, un-shuffling, combining the data from pairs of tracks, and error detection and correction could generally be omitted as well as the corresponding steps of error code generation, separation, shuffling, and modulation that would normally take place in the recording stations.

While there have been disclosed the preferred embodiments of the invention, it will be understood by those skilled in the art that numerous changes and modifications may be made without departing from the true spirit and scope of the invention as defined by the claims appended to and forming a part of this specification. The foregoing examples are described with respect to an NTSC television signal. However, in the event that the recorder is designed for a signal of another format, such as PAL, PAL-M, SECAM, and so forth, the foregoing principles apply with appropriate changes to accommodate the particular format.

What is claimed is:

1. In a recording/playback system wherein information is recorded digitally in predetermined sectors at a selected substantially constant bit rate on a record medium utilizing a self-clocking channel code operating at said bit rate, said information being recorded over periodic cycles, each periodic cycle comprising a plurality of said sectors, each sector corresponding to a respective interval of information recorded over each periodic cycle, with a predetermined one of said sectors corresponding to a particular interval in each said periodic cycle, a subsystem comprising:

means for providing a succession of bits at said bit rate according to a bit pattern that provides a periodic signal upon encoding according to said channel code, the period of said periodic signal being a multiple of the bit period, means for appending said periodic signal to the particular interval of information to be recorded in said predetermined one of said sectors over each said periodic cycle;

detection means for receiving from said medium said recorded information signal to be reproduced and said appended periodic signal, selectively detecting presence of said periodic signal in said received signal, and producing responsively a detection signal, and means responsive to said detection signal for producing a synchronization signal indicating a time of occurrence of said particular interval of information within each said periodic cycle.

2. A subsystem according to claim 1 wherein said means for appending appends said periodic signal as a preamble to the particular interval of information to be recorded in said predetermined one of said sectors.

3. A subsystem according to claim 2 wherein said self-clocking channel code is a Miller Channel Code and said period of said periodic signal is equal to six times the bit period.

4. A subsystem according to claim 1 where the recording/playback system includes a playback head, said subsystem further comprising means responsive to said detection signal for producing a magnitude signal indicative of the magnitude of said detection signal, and means responsive to magnitude signal for controlling the relative position of the record medium and the playback head to maximize said magnitude signal.

5. A subsystem according to claim 4 wherein said self-clocking channel code is a Miller Channel Code and said period of said periodic signal is equal to six times the bit period.

6. A subsystem according to claim 1 further comprising means for providing a timing reference signal, and means responsive to said synchronization signal and said timing reference signal for driving the record medium at a rate synchronizing said synchronization signal and said timing reference signal.

7. A subsystem according to claim 6 wherein said self-clocking channel code is a Miller Channel Code and said period of said periodic signal is equal to six times the bit period.

8. A subsystem according to any one of claims 1 to 7 wherein said detection means comprises an analog filter for detecting a signal having the frequency of said appended periodic signal.

9. A subsystem according to claim 8 wherein said analog filter is a band-pass filter.

10. A method of recording/playback wherein information is recorded digitally in predetermined sectors at a selected substantially constant bit rate on a record medium utilizing a self-clocking channel code operating at said bit rate, said information being recorded over periodic cycles, each periodic cycle comprising a plurality of said sectors, each sector corresponding to a respective interval of information recorded over each periodic cycle, with a predetermined one of said sectors corresponding to a particular interval in each said periodic cycle, said method comprising:

providing a succession of bits at said bit rate according to a bit pattern that provides a periodic signal upon encoding according to said channel code, the period of said periodic signal being a multiple of the bit period;

appending said periodic signal to the particular interval of information to be recorded in said predetermined one of said sectors over each said period cycle;

receiving from said medium said recorded information signal to be reproduced and said appended periodic signal, selectively detecting presence of said periodic signal in said received signal, and producing responsively a detection signal; and in response to said detection signal producing a synchronization signal indicating a time of occurrence of said particular interval of information within each said periodic cycle.

11. A method according to claim 10 wherein said periodic signal is appended as a preamble to the particular interval of information to be recorded in said predetermined one of said sectors.

12. A method according to claim 11 wherein said self-clocking channel code is a Miller Channel Code and said period of said periodic signal is equal to six times the bit period.

13. A method according to claim 10 wherein the recorded information is played back using a playback head, said method further comprising controlling the relative position of the record medium and the playback head to maximize the magnitude of said detection signal.

14. A method according to claim 13 wherein said self-clocking channel code is a Miller Channel Code and said period of said period signal is equal to six times the bit period.

15. A method according to claim 10 further comprising providing a timing reference signal, and driving the record medium at a rate synchronizing said synchronization signal and said timing reference signal.

16. A method according to claim 15 wherein said self-clocking channel code is a Miller Channel Code and said period of said periodic signal is equal to six times the bit period.

17. Apparatus for synchronizing the playback of information from a record medium transport comprising:

means for extracting a playback signal from the record medium, wherein the playback signal presents sectors preceded by synchronizing signals having a predetermined pattern;

a playback signal processing unit into which said playback signal is fed for extracting useful information from said sectors;

pattern detection means including a resonant circuit, into which said playback signal is fed for providing an indication whenever said predetermined pattern is presented in said signal;

a time reference;

comparison means for indicating whether said indication is properly synchronized with said time reference; and means controlled by said comparison means for adjusting the playback speed of said record medium transport to achieve playback synchronization between said indication and said time reference.

18. Apparatus for synchronizing the playback of information from a record medium transport comprising:

means for extracting a playback signal from the record medium, wherein said playback signal is a digital signal having a known data bit rate and presents sectors preceded by synchronizing signals having a predetermined pattern comprising a preamble that contains a strong frequency component at a submultiple of the data bit rate of the playback signal;

a playback signal processing unit into which said playback signal is fed for extracting useful information from said sectors;

pattern detection means into which said playback signal is fed for providing an indication whenever said predetermined pattern is presented in said signal, said pattern detection means including a resonant circuit tuned to the frequency of said component;

a time reference;

comparison means for indicating whether said indication is properly synchronized with said time reference; and means controlled by said comparison means for adjusting the playback speed of said record medium transport to achieve playback synchronization between said indication and said time reference.

19. Apparatus in accordance with claim 18 wherein said resonant circuit is tuned to one-sixth of the data bit rate of the playback signal.

20. Apparatus for synchronizing the playback of information from a record medium transport comprising:

means for extracting a playback signal from the record medium;

a playback signal processing unit into which said playback signal is fed for extracting useful information from said signal;

pattern detection means including a resonant circuit, into which said playback signal is fed for providing an indication whenever a predetermined pattern is presented in said signal;

a time reference;

comparison means for indicating whether said indication is properly synchronized with said time reference; and means controlled by said comparison means for adjusting the playback speed of said record medium transport to achieve playback synchronization between said indication and said time reference.

21. Apparatus in accordance with claim 20 wherein said resonant circuit is tuned to one-sixth of the data bit rate of the playback signal.

22. Apparatus for synchronizing the playback of information from a record medium transport wherein said record medium has a control signal recorded thereon, comprising:

means for extracting a playback signal from the record medium;

a playback signal processing unit into which said playback signal is fed for extracting useful information from said signal;

pattern detection means including a resonant circuit, into which said playback signal is fed for providing an indication whenever a predetermined pattern is presented in said signal;

a time reference;

means for extracting said control signal from the record medium;

means responsive to said control signal for adjusting the playback speed of said record medium transport to achieve coarse synchronization adjustment of said record medium and said time reference;

comparison means for indicating whether said indication is properly synchronized with said time reference; and means controlled by said comparison masn for adjusting the playback speed of said record medium transport to achieve playback synchronization between said indication and said time reference.

23. Apparatus in accordance with claim 22 wherein the playback signal presents sectors preceded by synchronizing signals, in which said predetermined pattern provides a form of synchronizing signal that precedes selected sectors, and in which said playback signal processing unit extracts useful information from said sectors.

24. Apparatus in accordance with claim 23 wherein said playback signal is a digital signal having a known data bit rate and wherein said predetermined pattern comprises a preamble that contains a strong frequency component at a submultiple of the data bit rate of the playback signal, and wherein said resonant circuit is tuned to the frequency of said component.

25. Apparatus in accordance with claim 24 wherein said resonant circuit is tuned to one-sixth of the data bit rate of the playback signal.

26. Apparatus in accordance with claim 22 wherein said playback signal is a digital signal having a known bit data rate and wherein said resonant circuit is tuned to one-sixth of the data bit rate of the playback signal.

27. Apparatus in accordance with claim 26 wherein the playback signal comprises sectors preceded by synchronizing signals, in which said predetermined pattern comprises a form of synchronizing signal that precedes selected sectors.

28. Apparatus in accordance with claim 27 wherein said playback signal is a digital signal having a known data bit rate and wherein said predetermined pattern comprises a preamble that contains a strong frequency component at a submultiple of the data bit rate, and wherein the resonant circuit is tuned to the frequency of said component.

29. Apparatus for playback of information from a record medium transport having a playback head tracking adjustment mechanism comprising:

means for extracting a playback signal from the record medium;

a playback signal processing unit into which said playback signal is fed for extracting useful information from said playback signal;

pattern detection means including a resonant circuit, into which said playback signal is fed for providing an indication of the magnitude of a component of a predetermined pattern in said playback signal whenever the predetermined pattern is present in said playback signal; and tracking means responsive to the magnitude of said pattern for adjusting the tracking of the playback head to maximize the magnitude of said component in said playback signal.

30. Apparatus in accordance with claim 29 wherein the playback signal presents sectors preceded by synchronizing signals, in which said predetermined pattern provides a form of synchronizing signal that precedes selected sectors, and in which said playback signal processing unit extracts useful information from said sectors.

31. Apparatus for playback of information from a record medium transport having a playback head tracking adjustment mechanism comprising:

means for extracting a playback signal from the record medium wherein said playback signal is a digital signal having a known data bit and presents sectors preceded by synchronizing signals;

a playback signal processing unit into which said playback signal is fed for extracting useful information from said sectors of said playback signal;

pattern detection maesn into which said playback signals is fed for providing an indication of the magnitude of a component of a predetermined pattern in said playback signal whenever the predetermined pattern is present in said playback signal, said predetermined pattern provides a form of synchronizing signal that precedes selected sectors and comprises a preamble that contains a strong frequency component at a submultiple of the data bit rate of the playback signal, said pattern detection means includes a resonant circuit tuned to the frequency of said component, and said playback signal processing unit extracts useful information from said sectors; and tracking means responsive to the magnitude of said pattern for adjusting the tracking of the playback head to maximize the magnitude of said component in said playback signal.

32. Apparatus in accordance with claim 31 wherein said resonant circuit is tuned to one-sixth of the data bit rate of the playback signal.

33. Apparatus for synchronizing the transfer of information between a playback station and a record station comprising:

means for extracting a playback signal from record medium at said record station;

pattern detection means into which said playback signal is fed for providing an indication whenever a predetermined pattern is presented in said signal;

means for extracting a time reference from said playback station;

comparison means for indicating whether said indication is properly synchronized with said time reference;

means controlled by said comparison means for adjusting the playback speed at said record station to achieve playback synchronization between said indication and said time reference; and means responsive to the achievement of playback synchronization for causing said record station to record signals presented by said playback station.

34. Apparatus in accordance with claim 33 wherein the means for extracting a playback signal at said record station includes record head means having at least one record head for utilization in a playback mode to extract a playback signal from the record medium and in a record mode to record signals presented by said playback station.

35. Apparatus in accordance with claim 34 further comprising means for placing at least one of said record heads periodically in said playback mode during recording to provide said indication to maintain synchronization between the playback and record stations.

36. Apparatus in accordance with claim 33 wherein the pattern detecting means includes a resonant circuit.

37. Apparatus in accordance with claim 36 wherein said playback signal is a digital signal having a known data bit rate and wherein said resonant circuit is tuned to one-sixth of the data bit rate of the playback signal.

38. Apparatus in accordance with claim 33 which further includes means for extracting a control signal from the record medium at said record station;

and means responsive to said control signal for adjusting the playback speed of the record medium transport at said record station to achieve coarse synchronization adjustment of the record medium and said time reference.

39. Apparatus in accordance with claim 38 wherein the playback signal comprises sectors preceded by synchronizing signals, in which said predetermined pattern comprises a form of synchronizing signal that precedes selected sectors.

40. Apparatus in accordance with claim 34 wherein said playback signal is a digital signal having a known data bit rate and wherein said predetermined pattern comprises a preamble that contains a strong frequency component at a submultiple of the data bit rate of the playback signal, and wherein said pattern detection means includes a resonant circuit tuned to the frequency of said component.

41. Apparatus in accordance with claim 40 wherein said resonant circuit is tuned to one-sixth of the data bit rate of the playback signal.

42. Apparatus in accordance with claim 38 wherein the pattern detecting means includes a resonant circuit.

43. Apparatus in accordance with claim 42 wherein said playback signal is a digital signal having a known data bit rate and wherein said resonant circuit is tuned to one-sixth of the data bit rate of the playback signal.

* * * * *